Oct. 28, 1924.
J. F. O'CONNOR
1,513,126
FRICTION SHOCK ABSORBING MECHANISM
Original Filed Dec. 27, 1921  2 Sheets-Sheet 1
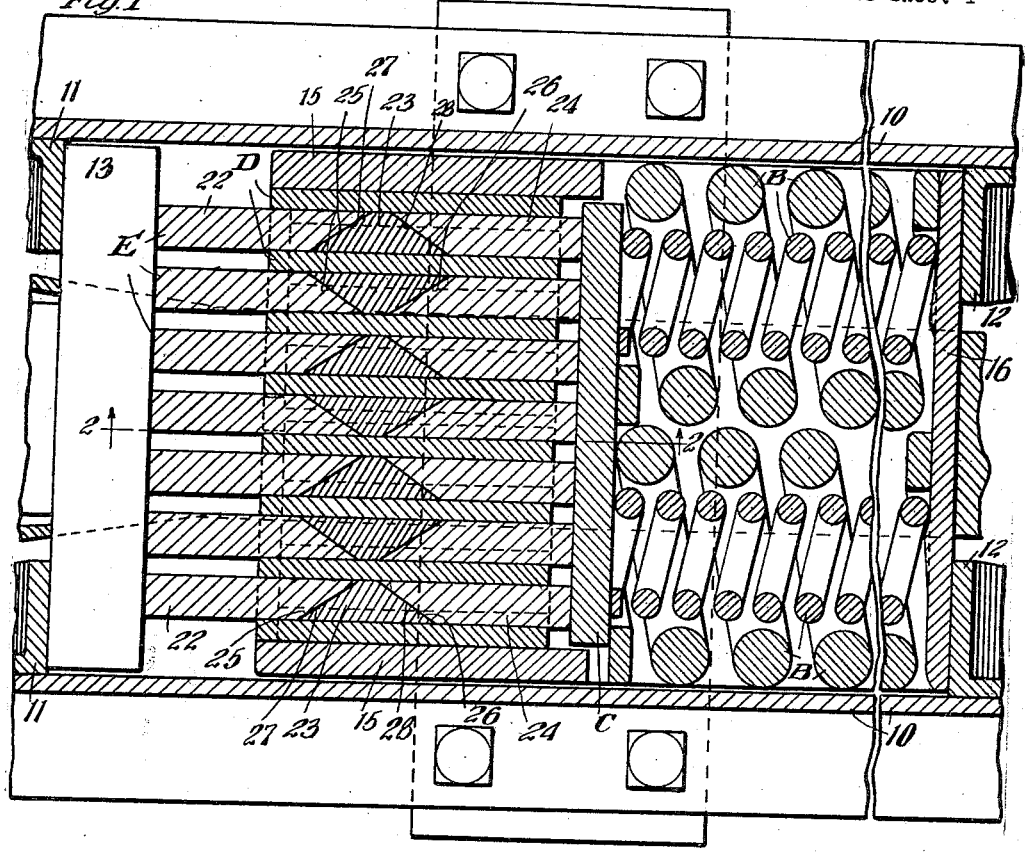
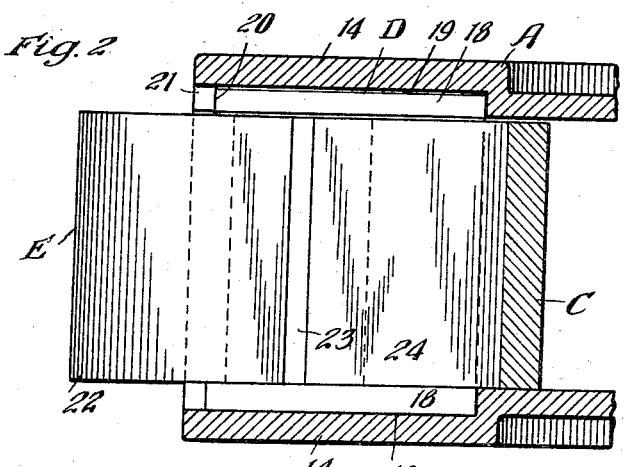
Witnesses
Wm. Geiger
Inventor
John F. O'Connor
By Geo. I. Haight
His Atty.

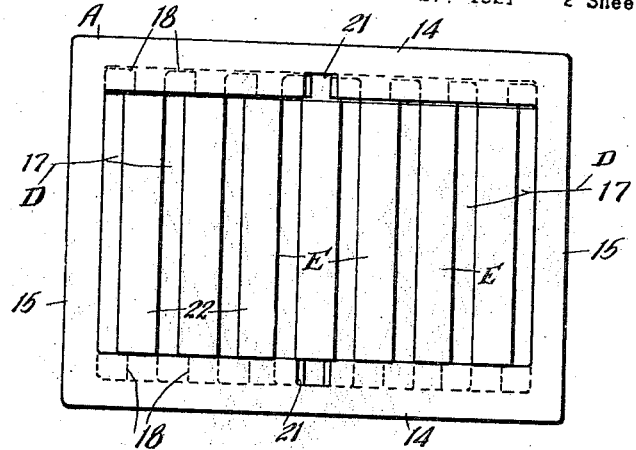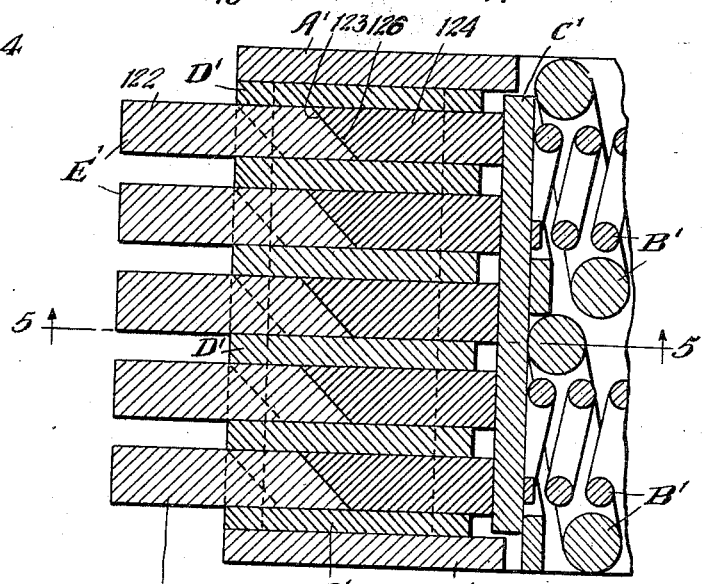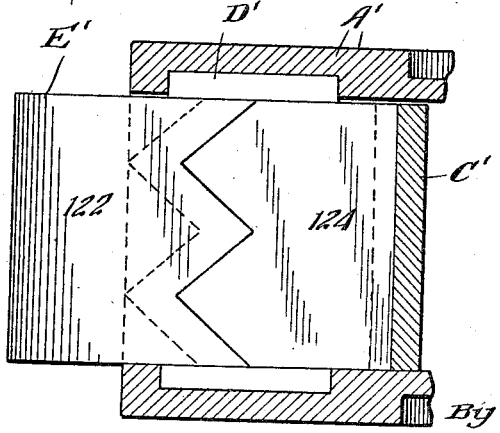

Patented Oct. 28, 1924.

1,513,126

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 27, 1921, Serial No. 525,015. Renewed April 10, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide an efficient high capacity friction shock absorbing mechanism especially adapted for railway draft riggings and wherein are employed intercalated plates of simple and economical construction with the parts so arranged as to insure certain release.

A more specific object of the invention is to provide a friction shock absorbing mechanism of the intercalated plate type comprising stationary plates or splines and movable plates or splines, the movable plates or splines each consisting of a plurality of sections capable of lateral expansion under pressure and easily collapsible during release.

Another specific object of the invention is to provide, in an intercalated plate type of friction gear, laterally self-wedging or expanding movable friction plates or splines.

In the drawings forming a part of this specification, Figure 1 is a horizontal, longitudinal, sectional view, parts broken away, illustrating a friction shock absorbing mechanism applied to a railway draft rigging, the mechanism embodying my improvements. Figure 2 is a vertical, longitudinal, sectional view corresponding substantially to the section line 2—2 of Figure 1. Figure 3 is an end elevational view of the shock absorbing mechanism proper shown in Figure 1. Figure 4 is a broken, longitudinal, horizontal, sectional view corresponding to Figure 1 but illustrating another embodiment of the invention. And Figure 5 is a vertical, sectional view corresponding substantially to the section line 5—5 of Figure 4.

Referring first to the construction illustrated in Figures 1 to 3 inclusive, 10—10 denote channel draft sills of a car underframe, the same having front and rear stop lugs 11 and 12 secured to the inner faces thereof. The improved shock absorbing mechanism proper is disposed between the sills and between the stop lugs in the usual manner and cooperable therewith is a front main follower 13 of well known form.

The improved shock absorbing mechanism proper, as shown, comprises, broadly, a combined friction shell and spring cage casting or follower-acting member or column-load-sustaining member A; twin arranged main springs B—B; a spring follower C; a series of relatively stationary friction plates or splines D—D; and a series of relatively movable friction plates or splines each indicated generally as an entirety by the reference character E.

The casting A, as shown, is formed with a friction shell proper at the forward end thereof, the same being defined by upper and lower horizontal walls 14—14 and side walls 15—15. The top and bottom walls 14 are extended to the rear end of the casting A and are integrally united by a vertical wall 16, the latter cooperating with the stop lugs 12 in the manner of a follower. The side walls 15 are relatively short to thereby leave the major portion of the sides of the casting A open to permit of the insertion and removal of the springs and certain other parts.

Within the hollow rectangular friction shell proper, above described, are disposed a plurality of stationary friction plates D, eight in number. Each of said plates D is formed with a main section or web 17 extending vertically, and upper and lower relatively narrow inturned horizontal flanges 18—18. The latter are disposed within transverse wide grooves or channels 19—19 formed on the inner sides of the upper and lower walls 14 of the casting A. The flanges 18 are cut away or notched at their forward ends as indicated at 20 in Figure 2 so that the outer ends of the main sections or webs 17 of the plates D will lie flush with the outer end of the casting A. The plates D are inserted through suitable notches 21—21 in the front end of the casting A, as best shown in Figure 3 and are then slipped sideways to their proper position. With the arrangement shown, it will be noted that the plates D are anchored to the casting A against longitudinal movement with respect thereto but are freely responsive to laterally applied pressure except as to the two outermost plates D which lie against the inner faces of the side walls 15 and may be considered as liners for the side walls of the shell proper.

Each of the movable friction plates or splines E, seven in number, as shown in the drawing, consists of three separable or independent sections 22, 23 and 24, said sections being longitudinally alined and each of the same thickness considered in a direction transversely of the casting A. Each outer section 22 is provided with a beveled or inclined wedge face 25 and the inner section 24 with an oppositely inclined wedge 26. The intermediate section 23 of each movable friction plate is provided with two oppositely extending wedge faces 27 and 28 cooperable with the wedge faces 25 and 26, respectively, of the end sections 22 and 24. With this arrangement, it is evident that when pressure is applied to the outer sections 22 of the movable friction plates, the latter will tend to shift to one side of the corresponding intermediate section 23 and the innermost sections 24 will be correspondingly shifted so that each movable friction plate E contains within itself means for increasing the effective over-all thickness thereof. Stated in another manner, each movable friction plate or spline may be said to be self-wedging or self-expanding laterally under pressure applied lengthwise thereof or parallel to the center line of the mechanism. The two end sections 22 and 24 will be forced in one direction and the intermediate section 23 will be forced in the opposite direction, thus tending to separate the adjacent stationary friction plates and creating the necessary friction between the movable and stationary plates during the compression stroke of the mechanism. Because of the wedging or expanding action which takes place in each one of the movable friction plates or splines, it is evident that very high frictional capacity is generated between the stationary and movable plates. Furthermore, it will be observed that all of the sections are of simple form and may be manufactured at relatively small expense.

The inner ends of the inner sections 24 of the movable plates bear upon the spring follower C which in turn bears upon the outer or front ends of the twin springs B.

Upon removal of the actuating force, after a compression stroke of the mechanism, the outer sections 22 of the movable friction plates may readily free themselves, inasmuch as there will be a very slight space between each of said sections and one of the adjacent stationary friction plates D. Similarly, upon the freeing or release of the outermost sections 22, the intermediate sections 23 may release themselves and thereafter the inner sections 24.

By making each of the movable friction plates or splines self-wedging or self-expanding, I avoid the necessity of using a single set of wedging means which must be expanded under very high pressure with consequent danger of sticking unless special precautions are taken to insure the release thereof after removal of the actuating force. In my arrangement, the entire blow, for wedging or expanding purposes, is distributed over a comparatively large number of self-wedging or self-expanding devices and no one of them is compelled to take an excessive load with consequent increased danger of sticking.

In the construction shown in Figures 4 and 5, the arrangement of casting A', main springs B', spring follower C' and stationary friction plates D' is the same as that of the corresponding elements in the construction illustrated in Figures 1, 2 and 3. In the arrangement of Figures 3, 4 and 5, the movable friction plates or splines E' are shown as consisting of only two sections each indicated at 122 and 124. The sections 122 and 124 are provided with cooperating wedge faces 123 and 126 so that one section will be forced toward one side of the casting A' and the other section toward the opposite side and thus into tight frictional engagement with the stationary friction plates. In order to increase the area of the wedging surfaces 123 and 126, the same are made of sawtoothed form as best indicated in Figure 5.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a column-load-sustaining member; of a spring resistance; a plurality of relatively stationary friction plates mounted on said member and freely responsive to pressure applied transversely thereof; and relatively longitudinally movable friction plates intercalated with said stationary plates, said movable friction plates each comprising a plurality of sections longitudinally alined and having cooperable wedge faces to thereby augment the effective over-all thickness of the movable friction plates when actuating load is applied lengthwise thereof.

2. In a friction shock absorbing mechanism, the combination with a hollow friction shell; of a spring resistance; a plurality of relatively stationary friction plates mounted within said friction shell, said plates being freely responsive to pressure applied transversely thereof; and a plurality of relatively longitudinally movable friction plates intercalated with said stationary plates, said movable friction plates each comprising a plurality of sections in longitudinal alinement, said sections having cooperable wedge faces effective to increase the over-all thickness of the movable friction plate when actuating load is applied lengthwise thereof, all sections of the movable friction plates having frictional engagement with stationary friction plates.

3. In a friction shock absorbing mechanism, the combination with a column-load-sustaining member; of a spring resistance; a plurality of relatively stationary friction plates mounted on said member and responsive to pressure applied transversely thereof; and laterally self-expanding longitudinally movable friction plates cooperable with said stationary friction plates, each of said movable friction plates having acting frictional contact with friction surfaces of stationary friction plates aggregating more than the area of the friction surface of one side of the stationary friction plate.

4. In a friction shock absorbing mechanism, the combination with a friction shell; of a spring resistance; a plurality of relatively stationary friction plates anchored within said shell against movement lengthwise thereof but responsive to pressure applied transversely thereto; and laterally self-expanding longitudinally movable friction plates cooperable with said stationary friction plates, each of said movable friction plates comprising a plurality of sections longitudinally alined, all sections having frictional contact with stationary friction plates, each movable friction plate having acting frictional contact with friction surfaces of stationary friction plates aggregating more than the area of the friction surface of one side of a stationary friction plate.

5. In a friction shock absorbing mechanism, the combination with a column-load-sustaining member; of a spring resistance; a plurality of relatively stationary friction plates mounted on said member and responsive to pressure applied transversely thereof; a plurality of relatively longitudinally movable friction plates alternated with said stationary plates, each of said movable friction plates comprising a plurality of sections longitudinally alined and provided with cooperable wedge faces to thereby augment the effective over-all thickness of the movable friction plate when actuating load is applied lengthwise thereto; and a follower interposed between the inner ends of said movable friction plates and the spring resistance.

6. In a friction shock absorbing mechanism, the combination with a hollow friction shell; of a spring resistance; a plurality of relatively stationary friction plates mounted within said shell and held against longitudinal movement with respect thereto but responsive to pressure applied transversely thereof; a plurality of relatively longitudinally movable friction plates alternated with said stationary plates, each of said movable friction plates comprising a plurality of longitudinally alined sections having cooperable wedge faces, all sections having frictional engagement with stationary friction plates; and a follower interposed between the inner ends of the movable friction plates and the spring resistance.

7. In a friction shock absorbing mechanism, the combination with a column-load-sustaining member; of a spring resistance; a plurality of relatively stationary friction plates mounted on said member and responsive to pressure applied transversely thereof; a plurality of laterally self-expanding, longitudinally movable friction plates, each movable friction plate having acting frictional contact with friction surfaces of stationary friction plates of aggregate area more than the friction surface of one side of a stationary friction plate; and a follower interposed between the spring resistance and the inner ends of the movable friction plates.

8. In a friction shock absorbing mechanism, the combination with a combined hollow friction shell and spring cage casting; of a spring resistance within the cage portion of said casting; a plurality of relatively stationary friction plates anchored to the interior of said shell against longitudinal movement with respect thereto but responsive to laterally applied pressure thereon; a plurality of laterally self-expanding longitudinally movable friction plates alternated with said stationary friction plates, each movable friction plate comprising a plurality of sections, all sections having frictional contact with stationary friction plates.

In witness that I claim the foregoing I have hereunto subscribed my name this 8th day of December 1921.

JOHN F. O'CONNOR.

Witnesses:
 UNA C. GRIGSBY,
 ANN BAKER.